June 22, 1926.

C. R. HASKELL 1,589,850

FARINACEOUS TUBULAR ROLLS

Filed Feb. 19, 1925

Inventor
C. Ray Haskell.
E. W. Anderson

By

Attorney

Patented June 22, 1926.

1,589,850

UNITED STATES PATENT OFFICE.

CHARLES RAY HASKELL, OF YOUNGSTOWN, NEW YORK, ASSIGNOR TO HASKELL CORPORATION, OF NIAGARA FALLS, NEW YORK, A CORPORATION OF NEW YORK.

FARINACEOUS TUBULAR ROLL.

Application filed February 19, 1925. Serial No. 10,360.

The invention has relation to farinaceous tubular rolls, having for an object to provide an improved roll of this description, the longitudinal bore or perforation of said roll being adapted to receive and to confine therein any suitable filling, such as a sausage or "hot dog", a slice of meat rolled up, or in fact any other edible filling, which in case the roll is made of cake, could be custard or other filling.

The invention consists in the novel product set forth in the appended claims.

In the accompanying drawings, illustrating a preferred form of device for use in carrying out the process; and illustrating the product:

Figure 1:
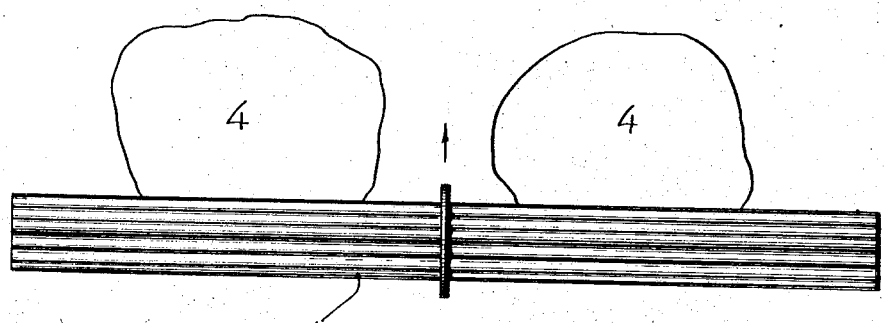
Figure 1 is a plan view of the former, showing the pieces of dough engaged thereby.
Figure 2:
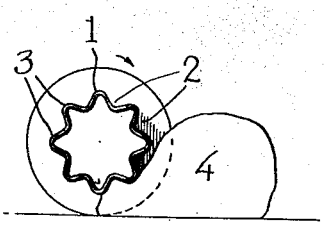
Figures 2, 3 and 4 are diagrammatic views illustrating the formation of the tubular roll.
Figure 3:
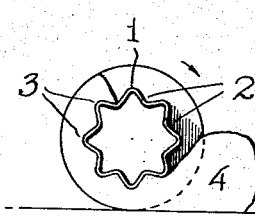
Figure 4:
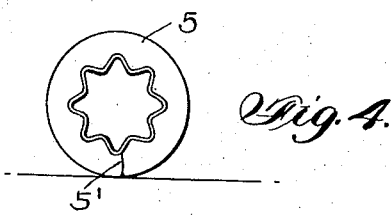
Figure 5:
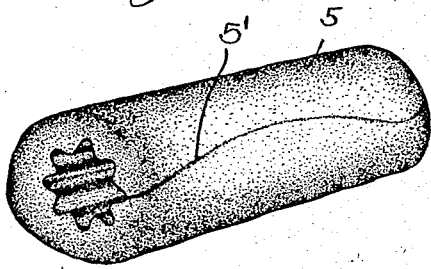
Figure 5 is a perspective view of the roll.
Figure 6:
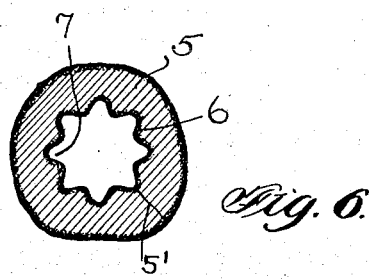
Figure 6 is a transverse sectional view of the same.

In these drawings, the numeral 1 designates a former or mold, having a plurality of straight longitudinal corrugations 2, extending in continuous series around the same, said former being basically of hollow cylindrical form, and said corrugations being made up of recesses or grooves 2, between ridges 3.

The purpose of the longitudinal corrugations of said former is to adapt said former to pick up or accumulate thereon the dough 4 from which the farinaceous roll is made in the rolling pressure of said former upon the dough, whereby the dough is distributed around said former in shape of a tubular roll 5 having a sealed longitudinal joint 5' extending from end to end along one side portion thereof, said roll, with said former contained therein, being then placed in an oven wherein it is baked, the tubular walls of the roll which are of approximately the same thickness throughout although subject to natural irregularities being in the baking caused to expand under the action of the yeast or baking powder constituent to several times their original volume or thickness, after which the tubular roll is stripped from said former by being slid endwise thereof, the straight longitudinal nature of the corrugations 2 admitting of such removal without mutilation or crumbling of the crusty lining 6 of the interior or bore of the roll, said lining conforming to or being molded by said corrugations so that it also is provided with straight longitudinal corrugations 7.

The tubular roll in the baking thereof is provided with crust upon the outside thereof as usual and also upon the lining of the longitudinal perforation thereof.

It is found in practice that the grooves between the ridges of the straight longitudinal corrugations 2 of the lining of the longitudinal bore of the roll, admit of a sausage being inserted within said bore through an open end thereof with mustard or other condiment, so that the condiment will remain in the grooves of the corrugations and not be pushed out therefrom in the insertion of the sausage as would be the case with a smooth walled longitudinal bore, the result being a more tasty article of food. Obviously the same result would be accomplished with a single straight longitudinal corrugation or groove or recess.

I claim:—

1. An elongated tubular farinaceous roll, having a straight open-end longitudinal bore wherein a sausage or other filling is adapted to be inserted, the surface of said bore being provided with a longitudinal recess to receive and hold a condiment.

2. An elongated tubular farinaceous roll, having a straight open-end longitudinal bore wherein a sausage or other filling is adapted to be inserted, the surface of said bore being provided with a continuous series of longitudinal corrugations extending around the same and providing longitudinal recesses to receive and hold a condiment.

In testimony whereof I affix my signature.

C. RAY HASKELL.